JULIUS WALTER.
Improvement in Awning Windlasses.
No. 124,178.　　　　　　　　　　　　　　Patented Feb. 27, 1872.
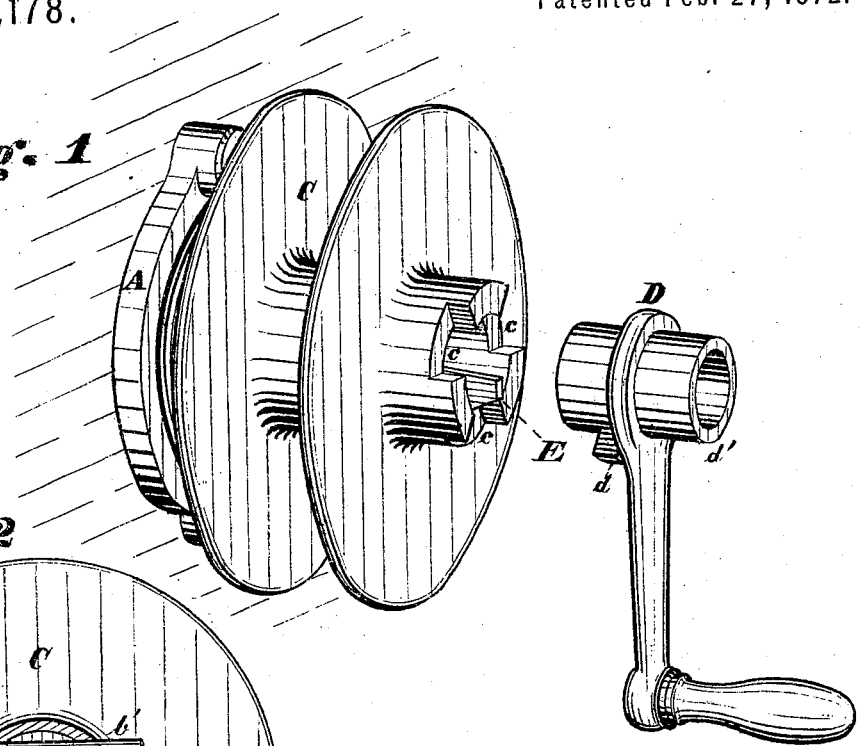
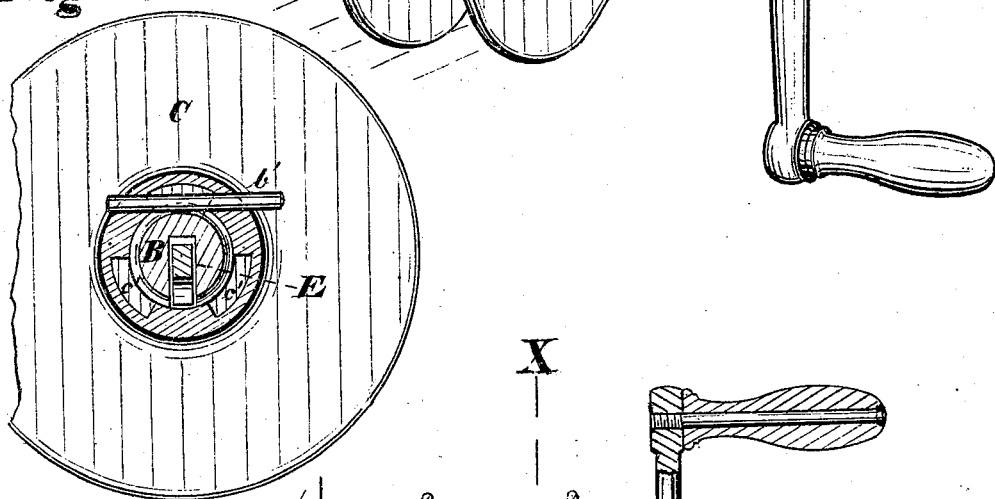
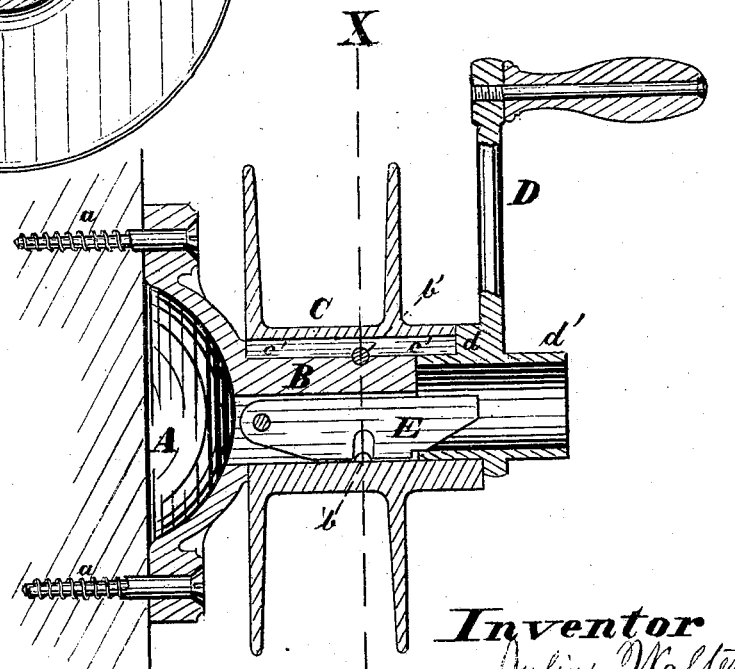
Attest  
C. W. Earnist  
Abr. von Kaennel.
Inventor  
Julius Walter  
pr T. Van Kannel & Co  
attys

UNITED STATES PATENT OFFICE.

JULIUS WALTER, OF CINCINNATI, OHIO.

IMPROVEMENT IN AWNING-WINDLASSES.

Specification forming part of Letters Patent No. 124,178, dated February 27, 1872.

*To all whom it may concern:*

Be it known that I, JULIUS WALTER, of Cincinnati, in the county of Hamilton and State of Ohio, have invented a new and Improved Awning-Windlass; and I do hereby declare that the following is a full, clear, and exact description of the same, reference being had to the annexed drawing making a part of this specification, in which—

Figure 1 is a perspective, Fig. 2 is a section in the line $x$ of Fig. 3, and Fig. 3 is a longitudinal vertical section of the same.

Similar letters of reference indicate like parts.

The nature of my invention relates to an apparatus for winding up an awning or other similar structure with greater ease and without the inconvenience of tangling the line or rope used for the purpose. It consists in having a suitable reel rotating around a pin fitting its interior. This pin is provided with a suitable base, which is screwed to the house or any permanent point. It also consists of a novel and efficient clutch and detaching device, whereby the crank is made to detach the reel when desired.

In construction my invention is as follows: A is the base, held in place by means of wood screws $a$. The base A and stud B are made of one piece, as seen in Fig. 3. At C is the reel which takes up the rope. D is the crank, the hub of which is provided with a projection, $d$, fitting into corresponding notches $c\ c$ of reel C. A small groove, $b$, is turned into the stud B, which receives a pin, $b'$, to prevent the reel leaving its place. E is a latch, let into the stud B, being pivoted at one end so that the other may drop freely into corresponding notches, $c'$, formed into the reel, which device acts on the principle of a pawl and ratchet. The end of the hub, represented by $d'$, is not provided with a projection corresponding to that of $d$, formed on the other end of the hub, as the purpose of the part $d$ is simply to detach the latch E from the reel C.

In operation my invention is as follows: When the windlass is to be put into operation the crank D is inserted in the reel, as seen in Fig. 3. This engages the crank D with reel C. The latter may now be wound up as in ordinary windlass. When the proper tension is obtained the crank is withdrawn, which allows the latch E to drop into recess $c'$, thus securely locking the reel at any desired point. When it is required to unlock the reel, the part $d'$ of crank D is inserted in the end of the reel, which elevates the latch E, thus disengaging the reel from the stud B and allowing the awning to unwind freely.

Having thus described my invention, what I claim as new, and desire to secure by Letters Patent, is—

1. The combination of the reel C provided with recesses $c$ and $c'$, stud B, crank D, provided with projection $d$ and latch E, all constructed and operating as herein set forth.

2. A windlass, as herein described, for raising or lowering awnings, as specified.

JULIUS WALTER.

Witnesses:
T. VAN KANNEL,
ABR. VON KANNEL.